United States Patent
Ceglarek

(10) Patent No.: US 11,541,798 B2
(45) Date of Patent: Jan. 3, 2023

(54) PNEUMATIC ADJUSTING DEVICE FOR A SIDE WING OF A VEHICLE SEAT

(71) Applicant: Faurecia Autositze GmbH, Stadthagen (DE)

(72) Inventor: Piotr Ceglarek, Katowice (PL)

(73) Assignee: Faurecia Autositze GmbH, Stadthagen (DE)

(*) Notice: Subject to any disclaimer, the term of this patent is extended or adjusted under 35 U.S.C. 154(b) by 45 days.

(21) Appl. No.: 17/171,319

(22) Filed: Feb. 9, 2021

(65) Prior Publication Data

US 2021/0245643 A1    Aug. 12, 2021

(30) Foreign Application Priority Data

Feb. 10, 2020    (DE) ................. 10 2020 103 243.9

(51) Int. Cl.
  *B60N 2/90*    (2018.01)
  *B60N 2/885*   (2018.01)
  *B60N 2/28*    (2006.01)

(52) U.S. Cl.
  CPC .............. *B60N 2/99* (2018.02); *B60N 2/914* (2018.02); *B60N 2/2872* (2013.01); *B60N 2/885* (2018.02)

(58) Field of Classification Search
  CPC ........ B60N 2/99; B60N 2/914; B60N 2/2872; B60N 2/885
  See application file for complete search history.

(56) References Cited

U.S. PATENT DOCUMENTS

| | | | |
|---|---|---|---|
| 5,082,326 A | 1/1992 | Sekido | |
| 10,286,811 B2 | 5/2019 | Beuschel | |
| 2005/0161921 A1 | 7/2005 | Higuchi | |
| 2010/0117412 A1* | 5/2010 | Bicker | B60N 2/0224 297/284.6 |
| 2018/0370397 A1 | 12/2018 | Rist | |

FOREIGN PATENT DOCUMENTS

| | | |
|---|---|---|
| DE | 102007009891 A1 | 9/2008 |
| DE | 102009041457 A1 | 11/2010 |
| DE | 102014201663 A1 | 7/2015 |
| DE | 102015223226 A1 | 5/2017 |
| EP | 0343025 A1 | 11/1989 |
| GB | 2255905 A | 11/1992 |

* cited by examiner

*Primary Examiner* — Syed A Islam
(74) *Attorney, Agent, or Firm* — Barnes & Thornburg LLP

(57) ABSTRACT

The present disclosure relates to a pneumatic adjusting device for adjusting a side wing of a vehicle seat from a default position to an actuation position, the adjusting device comprising: a two-armed lever having an outer lever arm for adjusting the side wing and an inner lever arm, an inflatable balloon device, e.g. balloon, for adjusting the inner for adjusting the arm, and mechanical spring means for adjusting the inner for adjusting the arm.

Hereby, it is provided that, in the default position of the adjusting device, the balloon device is inflated, in the default position, the spring means is tensioned and biases the inner lever arm into the actuation position, and in the actuation position, the spring means compresses the balloon.

17 Claims, 5 Drawing Sheets

PNEUMATIC ADJUSTING DEVICE FOR A SIDE WING OF A VEHICLE SEAT

PRIORITY CLAIM

This application claims priority to German Patent Application No. DE 10 2020 103 243.9, filed Feb. 10, 2020, which is expressly incorporated by reference herein.

BACKGROUND

The present disclosure relates to an adjusting device for a side wing of a vehicle seat and a corresponding vehicle seat.

SUMMARY

According to the present disclosure, a vehicle seat includes a seat cushion and a back rest the seat occupant is usually seated in-between laterally projecting side wings (side bolsters) which thereby support the occupant sideways. Hereby, some vehicle seats allow their side wings to be adjusted to the seat occupant.

In illustrative embodiments, a lever is provided as pivoting which may be articulated, in particular, in a swivel axis to a frame, e.g. back rest frame, of the vehicle seat. The lever, with its outer lever arm, i.e. the lever arm projecting outwards, pivots the side wing inwards and outwards; the lever is actuated via its inner lever arm, which is engaged by, on the one hand, a balloon device, i.e. in particular a one-chamber or multiple-chamber balloon or air pocket, and, on the other hand, a spring means. Hereby, the balloon device presses to inner lever arm into the default position, i.e. in particular, inwards in such a way that the outer lever arm is pivoted outwards thereby adjusting the side wing or a lateral support of the side wing respectively into the opened position. To that end, the balloon device may be provided, in particular, directly between the inner lever arm and a counter bearing or, respectively, a support affixed to the seat, e.g. the back rest frame. The spring means counteracts the balloon device and biases the inner lever arm into the actuation position.

In illustrative embodiments, the spring means may be any means for storing energy and exerting a force, i.e. in particular, storing energy by means of deformation, compression or extension/expansion. To that end, the spring means may be, in particular, a mechanical spring means, i.e. in particular elastically tensile by torsion or tension. Thus, the spring means may be e.g. a helical spring or a torsion bar. Hereby, the spring means may be e.g. a metal spring, but alternatively also a rubber spring or a composite spring made of a multiplicity of materials, a plastics spring or any combination thereof. Thus, according to one embodiment, the spring means may even be designed to be pneumatic, i.e. as a spring balloon device, counteracting the first balloon device. The spring means may be stretched, in particular, between the inner lever arm and a counter bearing affixed to the seat, e.g. the back rest frame.

The spring bias of the spring enables a quick adjustment of the side wing into the actuation position; this adjustment direction does not depend on the pneumatic actuation or, respectively, the relatively slow filling of the balloon via the pump and the duct. Thus, it is possible, despite limited dimensions of the balloon device, the pneumatic duct, and the pneumatic pump or compressor respectively, to still attain a quick and secure inwards adjustment of the side wing.

Then, for resetting, the balloon device is re-inflated so that it swivels—against the action of the spring—the inner lever arm back again into its default position, i.e. inwards, causing the outer lever arm projecting into the side wing to swivel outwards.

Thus, it is possible, in particular, to attain an adjustment speed from the default position into the actuation position corresponding to that of an electro-mechanical adjustment means, without having to provide for such an expensive hardware including the required electro-mechanical means in the side wings.

Thus, a significant advantage of the present disclosure lies in the reduced reaction time and quicker adjustment of the side wing, independent of the dimensions of the pneumatic devices.

According to the present disclosure there is further provided a locking means locking the default position. Thus, at first, the balloon device is intended to tension the spring means from the actuation position into the default position, i.e. the balloon device acts against the spring means during filling, swivels the lever thereby tensioning the spring means. After the default position has been reached the locking means locks this default position, in particular as a mechanical lock. Thus, the lever and thereby the side wing will remain in the default position until the locking means is again adjusted from its locking position to its unlocking position thereby releasing the spring means. The tensioned, now released spring means can then slacken off thereby adjusting the inner lever arm into the actuation position.

By virtue of the additional locking means a few advantages ensue:

Without the locking means, firstly, the balloon device is provided to hold the spring means in its tensioned position. Thus, the balloon device filled with air, in the default position, acts permanently against the tensioned spring means. However, pneumatic balloon devices may generally exhibit a certain leakage that may be occurring over time in the balloon device itself or also in the pneumatic ducts, or the connections between the balloon device and the pneumatic ducts. Since the default position is held over a longer period and the balloon device is initially loaded by the tensioned spring means, i.e. possibly exhibiting a slight excess pressure due to the spring tension, a loss of air may occur in the balloon device after a longer period of time, which—in the event of an unlocked default position—has to be compensated by re-filling.

In order to attain a long-term secured default position with little effort and a high level of security, according to the present disclosure, a locking means is provided.

Therefore, since the default position is locked, i.e., thus, in particular the lever and/or the spring means being locked in the default position, following the adjustment into the default position, the balloon device is no longer to hold the default position. Thus, the balloon device may subsequently be emptied in total or in part. In principle, it is not necessary to empty the balloon device after locking; however, it is possible to release a valve of the pneumatic duct to the balloon device so that the balloon device may empty again.

The locking means may lock, in particular, the lever, in particular, the inner lever arm, and/or the spring means. The locking means may be, in particular a mechanical locking means, i.e. carry out a mechanical adjustment and mechanical lock the lever and/or the spring means.

This locking effect may be achieved, in particular, by virtue of a form fit and/or by engaging in behind. Thus, the locking means may engage e.g. in behind the inner lever arm and/or the spring means by means of a latch, e.g. a mechanical locking arm, thereby blocking the adjustment of the lever arm and/or the spring means into the actuation position. By means of such a mechanical lock or, respectively, a mechanical engaging in behind a high level of security is attained; without adjustment of the locking means into its unlocked position the spring means and/or the lever arm will not be released and, consequentially, cannot be adjusted into the actuation position.

The locking means may in turn be adjusted pneumatically or even non-pneumatically. The locking means may be e.g. pivoting mounted or hinged, e.g. on the back rest frame. Thus, the locking means—such as the lever or inner lever arm respectively—may be firmly held on the back rest frame, so that the bearing of the locking means will not be affected by any adjustment between the default position and the actuation position.

The present disclosure leads to a number of advantages:

A secure hold in the default position with biased spring means is attained, without the balloon device maintaining a sustained force for holding the biased spring means.

It is not necessary to monitor or measure the pressure inside the balloon device; moreover, it is not necessary to detect a possible leakage during the default position phase.

The balloon device and its pneumatic duct are to be dimensioned sufficiently secure to enable filling the balloon device for adjusting the lever arm and for tensioning the spring means; however, in principle, leakage occurring in the long term does not present a problem.

Replenishing or refilling is not required to hold the default position; thus, in principle, the complexity of the control is reduced.

It is made possible to repeatedly position the side wings because there is secure locking after adjustment.

The balloon device and its pneumatic ducts are conserved because they are not permanently pressure stressed in the default position; merely the adjustment procedures for adjusting the lever and the spring means into the default position are required. This also extends the service life of the balloon device as well as the pneumatic components.

In principle, the locking means may be designed in a standardized manner for different systems. It may be provided such that it allows for mechanical locking, independently of the respectively employed balloon devices which may differ in size, volume and shape, possible even in the amount of air pressure used. Hereby, in principle, the locking means may be designed in a standardized manner and allows for a universal solution.

Customer acceptance is increased because the secure mechanical locking helps to avoid a persistent pneumatic exertion of pressure for securing the default position.

Further, the balloon device, the pneumatic ducts leading to the balloon device, and the pneumatic valves for filling the balloon device may be configured for the filling process, i.e. the procedure for making the adjustment to the default position, including e.g. as regards the des pneumatic transport volume. This can enable a quick filling process thereby also allowing for quick adjustments.

Further, the adjustment from the default position to the actuation position can be accelerated because with this adjustment the spring means is no longer required to compress the balloon device.

The locking means is adjusted by a locking adjustment device which in turn may be formed by a pneumatic locking adjustment device, in particular, by a locking balloon. This pneumatic locking adjustment device, in principle, may be dimensioned significantly smaller than the balloon device for adjusting the inner lever arm and for tensioning the spring means; for the pneumatic locking adjustment device it is not necessary to exert a force like in the case of the balloon device for adjusting the inner lever arm.

Hereby, a pneumatic locking adjustment device, in particular a pneumatic locking balloon, allows for a pneumatic control of both the balloon device for adjusting the inner lever arm and the pneumatic locking adjustment device. This, in principle, it is possible to provide a common pneumatic control device, e.g. having several pneumatic valves, which may be provided in a common housing. Thus, it is possible again to attain a high cost efficiency and a small portion of components. Hereby, it is possible to provide secure control of the various procedures, in particular the adjustment between default position and actuation position as well as, vice versa, from the actuation position to the default position, and, further, the locking after the adjustment from the actuation position to the default position. Thus, a common valve block may be provided for guaranteeing all functions and adjustments.

Hereby, in principle, a pneumatic pump may be provided which e.g. feeds air to the common valve block which will then supply the different pneumatic inserts, both for the balloon device for adjusting the inner lever arm and tensioning the spring means and the pneumatic locking adjustment device, with air or compressed air respectively.

In the alternative, an additional pump for e.g. the active adjustment of the inner lever arm may be provided, thereby increasing the performance of this adjustment means. Thus, the adjustment of the lever and the side wings may happen directly via the additional pump without the necessity of guiding the air flow via the valve block.

According to the present disclosure, the adjusting device may be provided inside the back rest and/or inside the seat cushion, i.e. therein respectively inwards adjusting the side wings for supporting the seat occupant and to return these outwards into the outer position for re-adjustment. Thus, a vehicle seat may exhibit such adjustment devices both in the back rest and in the seat portion which, in particular, are also actuated by a common pump with corresponding v ducts. Hereby, the relatively slow re-adjustment by the common pump is not relevant.

The development according to the present disclosure can be used with different designs of the side wing of the back rest and the seat cushion, whereby, in each case, suitable levers with lever arms projecting into the side wings may be provided. Thus, it is possible to aspire to a cost efficient, uniform development for different types of seats.

The weight of the vehicle seat is increased by the adjusting device only to a minor extent, because e.g. a balloon and pneumatic duct can be formed using little mass and volume, also the mechanical resetting device may be formed by a simple spring, e.g. tension spring or torsion spring, exhibiting no relevant amount of weight. In particular, several such adjustment devices may be mounted on the vehicle seat. The locking means and its controller, too, can be formed in a simple manner, in principle.

Further, the packaging or the assembling respectively of the adjusting device may be moved essentially from the bolster region towards the interior of the seat cushion or the back rest; thus, the inner lever arm, the spring means, and the balloon device may be provided in an inner region so that only the outer lever arm projects into the bolster region, e.g. by a side wing adjusted by it. This improves the freedom of design of the bolster and the packaging.

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which.

DETAILED DESCRIPTION

Figure 1:
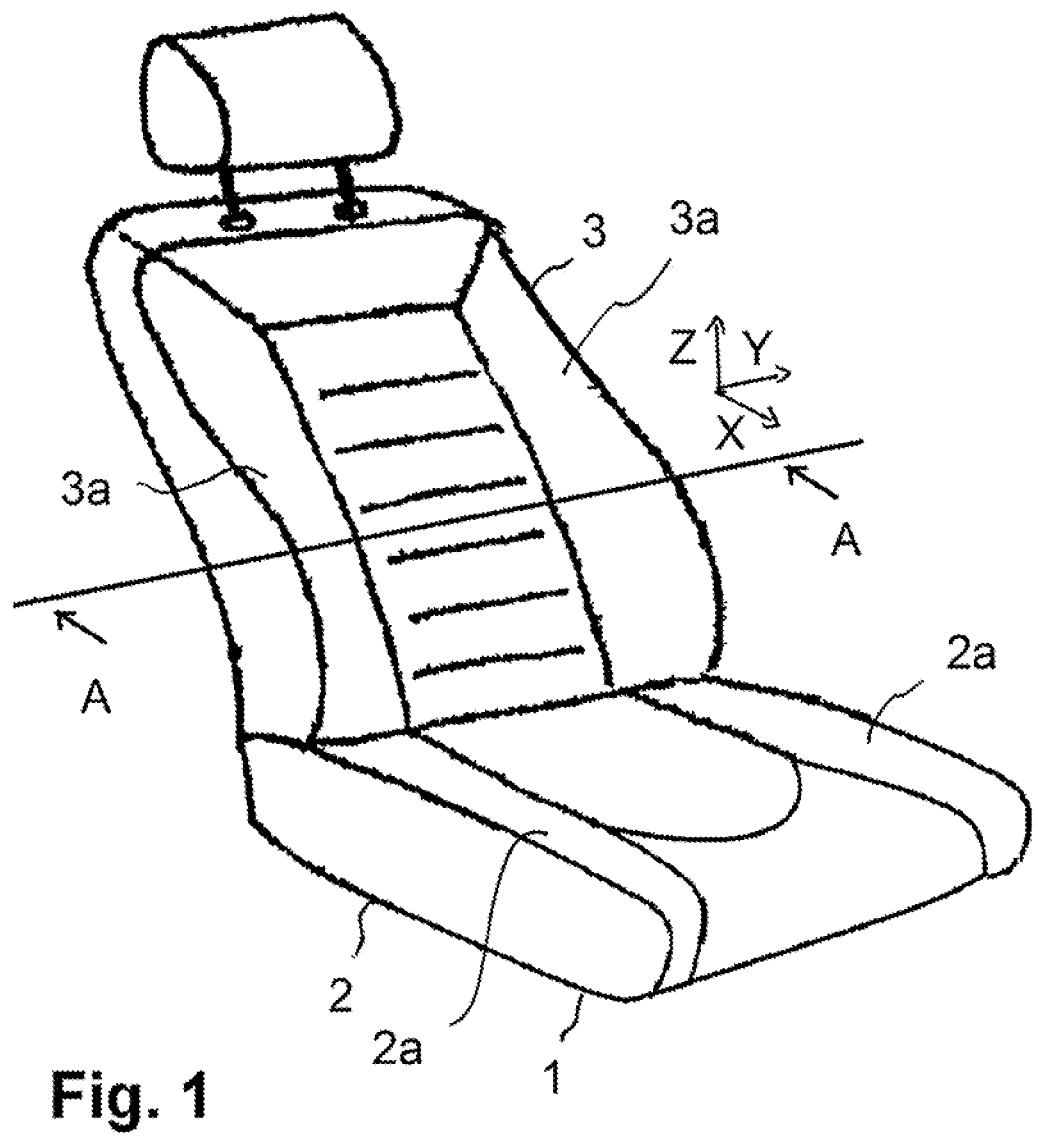
FIG. 1 is a front perspective view of a vehicle seat.

A vehicle seat 1 according to FIG. 1 a seat cushion (seat portion) 2 including seat portion side wings 2a and a back rest 3 with back rest side wings 3a. An adjusting device 4 for adjusting or adapting respectively to the seat occupant 5—indicated in FIGS. 2 and 3—may be provided on the seat cushion 2 and/or the back rest 3. The Figures show a corresponding design of the adjusting device 4 in the back rest 3 for adjusting the back rest side wings 3a.

An adjustment may occur e.g. already when the seat occupant 5 gets seated; further, it may happen e.g. in critical driving situations and/or upon rounding turns and corresponding Inertial loads of the seat occupants 5. Hereby, the two lateral back rest side wings 3a are swiveled in a transverse direction, i.e. in the direction Y or, respectively, in the direction negative Y. The adjusting device 4 is shown in more detail in FIGS. 2, 3 and comprises a left wing adjustment means 4a and a right wing adjustment means 4b which are designed, in principle, similar or, respectively, symmetrically identical in relation to one another so that in the following only the left wing adjustment means 4a will be described. The wing adjustment means 4a comprises a lever 7 with an inner lever arm 7a and an outer lever arm 7b, whereby the lever 7 with its swivel axis 7c is received in the back rest frame 8 and thereby in a principally inflexible manner. The outer lever arm 7b is received in a side support 6, e.g. made of plastics, or, respectively, adjusts the side support 6, which projects into the back rest side wing 3a; thus, when the outer lever arm 7b swivels inwards from the position of FIG. 2 to the position of FIG. 3, the side support 6 is also adjusted inwards and pushes the back rest side wing 3a inwards.

The wing adjustment means 4a, 4b are each biased into their open or opened respectively receiving position. For this purpose, a spring 9 is provided, in this case as a tension spring, on the left wing adjustment means 4a, the spring engaging the inner lever 7a and biasing this relative to the back rest frame 8. Further, an inflatable balloon 10 is provided between the inner lever 7a and the back rest frame 8, which is inflated, i.e. filled with air, in opened, default position of the back rest side wing 3a shown in FIG. 2. Thus, by inflating, i.e. filing with air, the balloon 10 the inner lever 7a is adjusted away from the back rest frame 8, i.e. in the transverse direction towards the seat interior; accordingly, the outer lever 7b projecting forward into the side wing 4a is swiveled outwards so that the wing 4a is in its open receiving position. Hereby, the spring 9 is adjusted to its tensioned position, i.e. it pulls the inner lever 7a outwards, i.e. in FIG. 2, left side, towards the left, so that the balloon 10 is tensioned accordingly by the spring biased inner lever 7a. Thus, both wing adjustment means 4a, 4b are adjusted by their respective balloon 10 and via their inner lever 7a into the receiving position open towards the outside or, respectively, default position and biased by their respective spring 9 towards the closed adjustment position.

Upon activation of the adjustment the balloon 10 is deflated via a pump or a compressor and a duct 11, merely indicated here, serving as feed and discharge for air to the balloon. Hereby, the spring bias by the tension loaded spring 9 causes the inner lever arm 7a to be spring biased quickly or abruptly adjusted to the actuated adjustment position shown in FIG. 3. Hereby, as shown in FIG. 3 by the arrows, the outer lever 7b projecting with the side support 6 into the back rest side wings 3a is adjusted inwards in a transverse direction thereby allowing for an adaptation to the seat occupants 5 sitting between the back rest side wings 3a. Thus the adjustment speed is determined, in particular, by the spring bias of the spring 9. This resetting according to FIG. 3 into the receiving position of FIG. 2 occurs, in turn, in that the pump, not shown, inflates the balloon 10 via the duct 11, hence the balloon 10 being filled with air against the action of the spring 9, thereby swiveling the inner lever 7a inwards.

Figure 2:
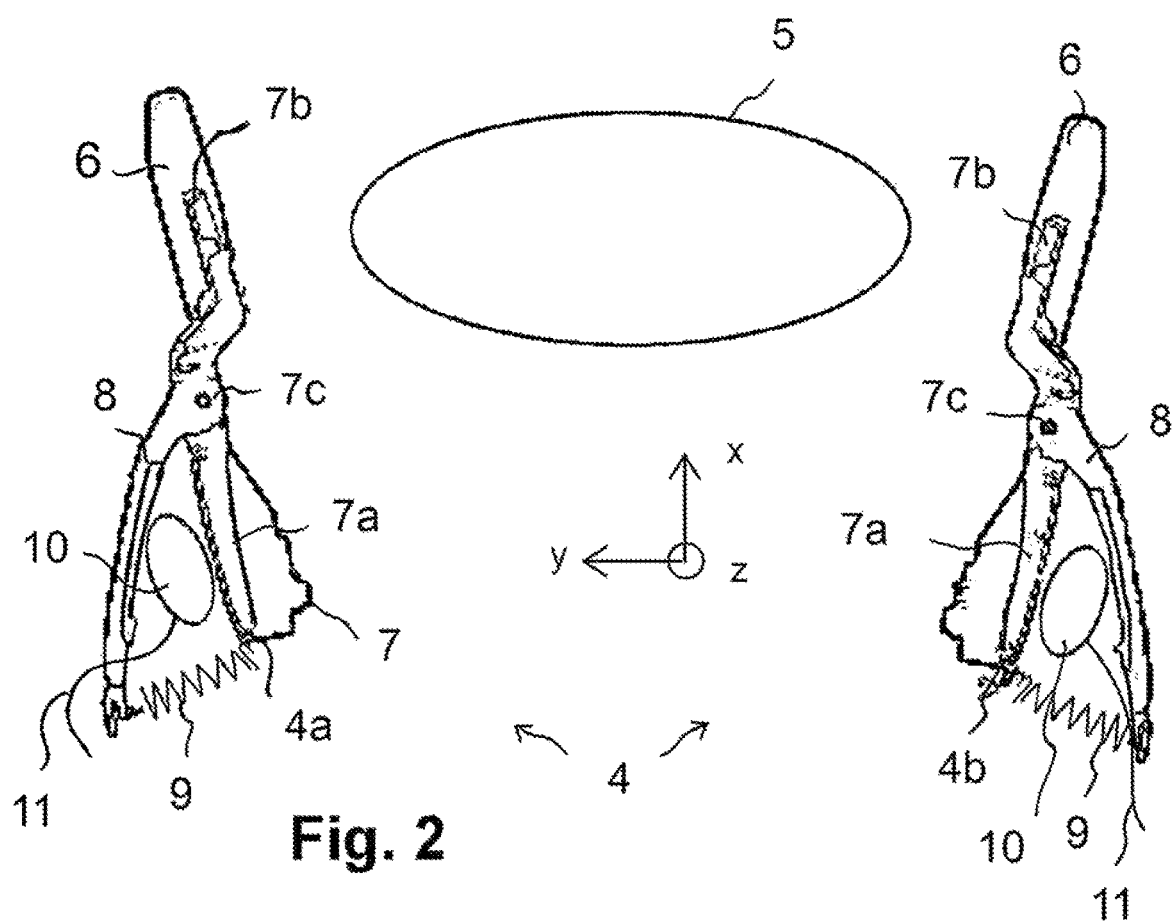
FIG. 2 is a sectional view along the line A-A from FIG. 1 of the side wings of the back rest, in a default position.
Figure 3:
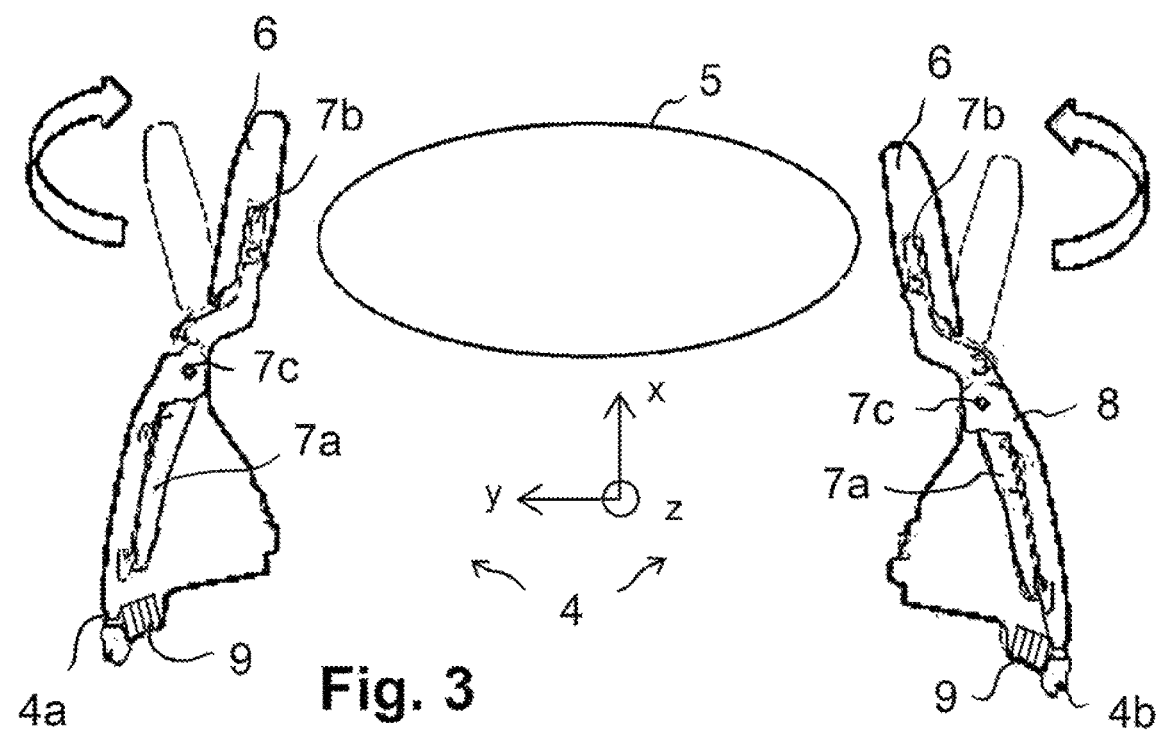
FIG. 3 is representation corresponding to that of FIG. 2 upon actuation of the side wings adjustment.

Thus, the adjustment speed from the default position of FIG. 2 to the adjustment position of FIG. 3 is not determined by the pumping performance of the pump and is, in particular, higher than the resetting speed of the resetting from FIG. 3 to the receiving position of FIG. 2.

Hereby, the adjusting device 4 with the wing adjustment means 4a, 4b may be provided both in the back rest 3 and in the seat cushion 2 for adjusting the seat portion side wings 2a.

Figure 4:
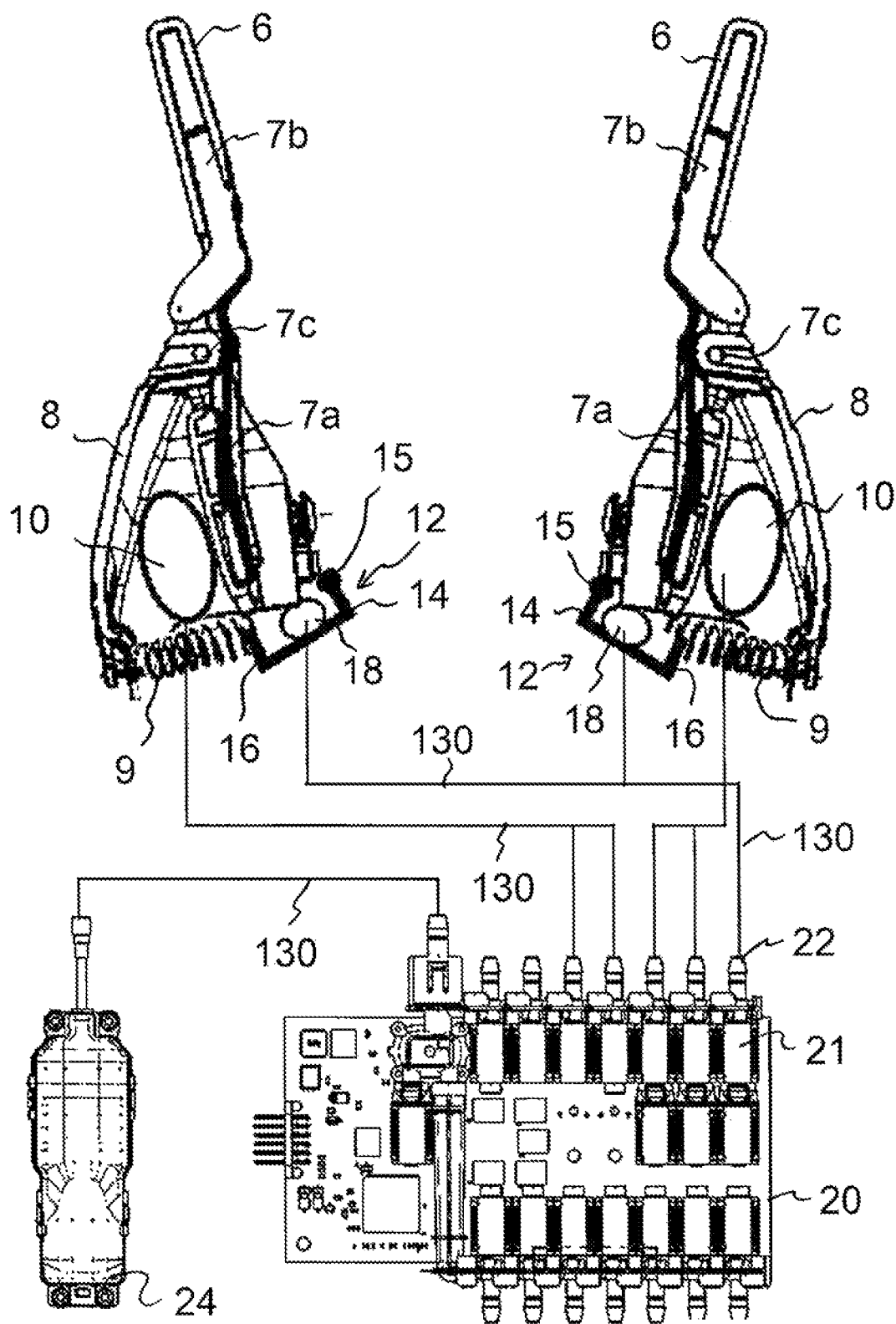
FIG. 4 show an embodiment including locking devices for locking the default position, in an unlocked position of the locking means.
Figure 5:
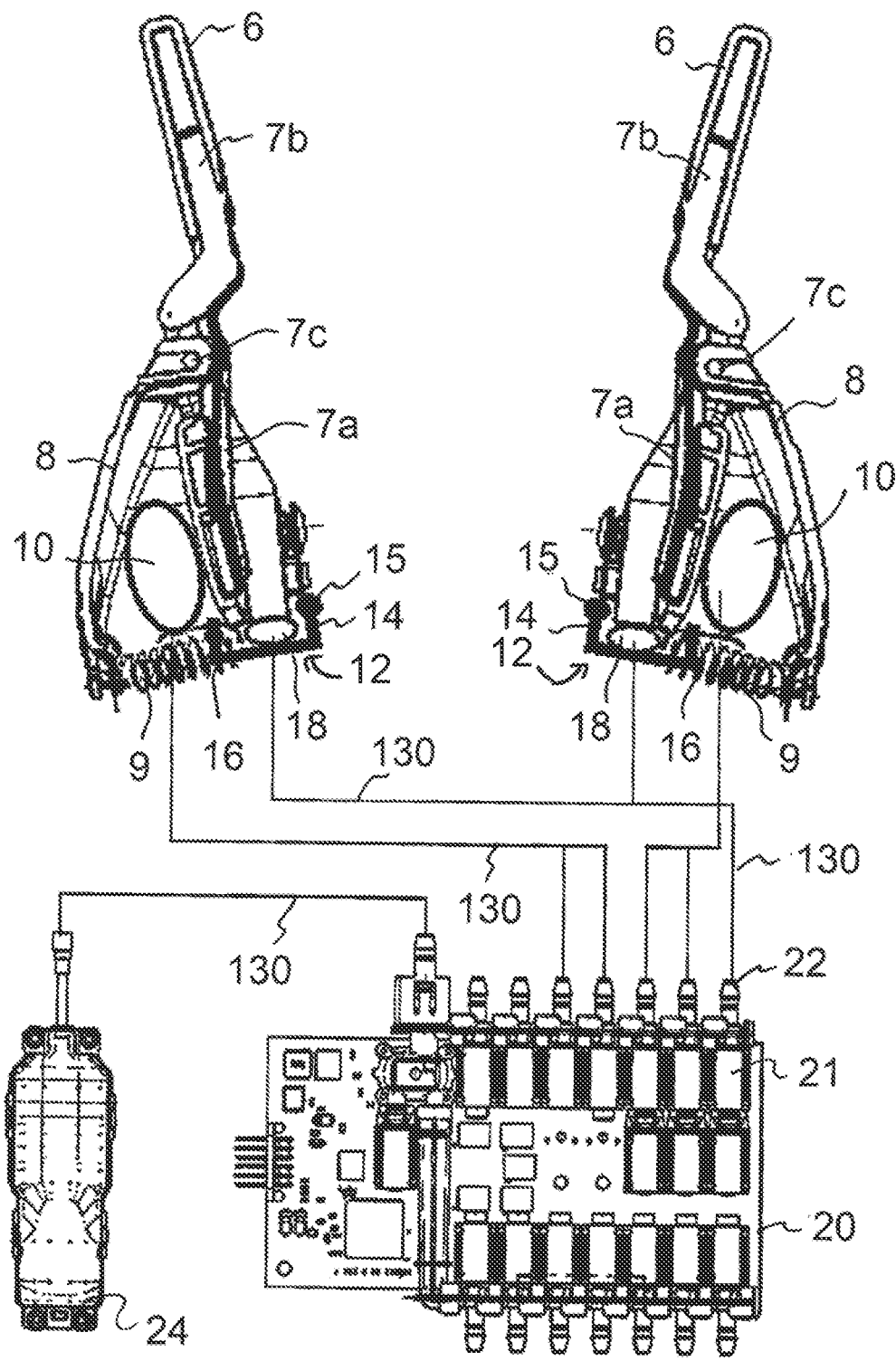
FIG. 5 is the representation corresponding to that of FIG. 4 in the locked position of the locking means.
Figure 6:
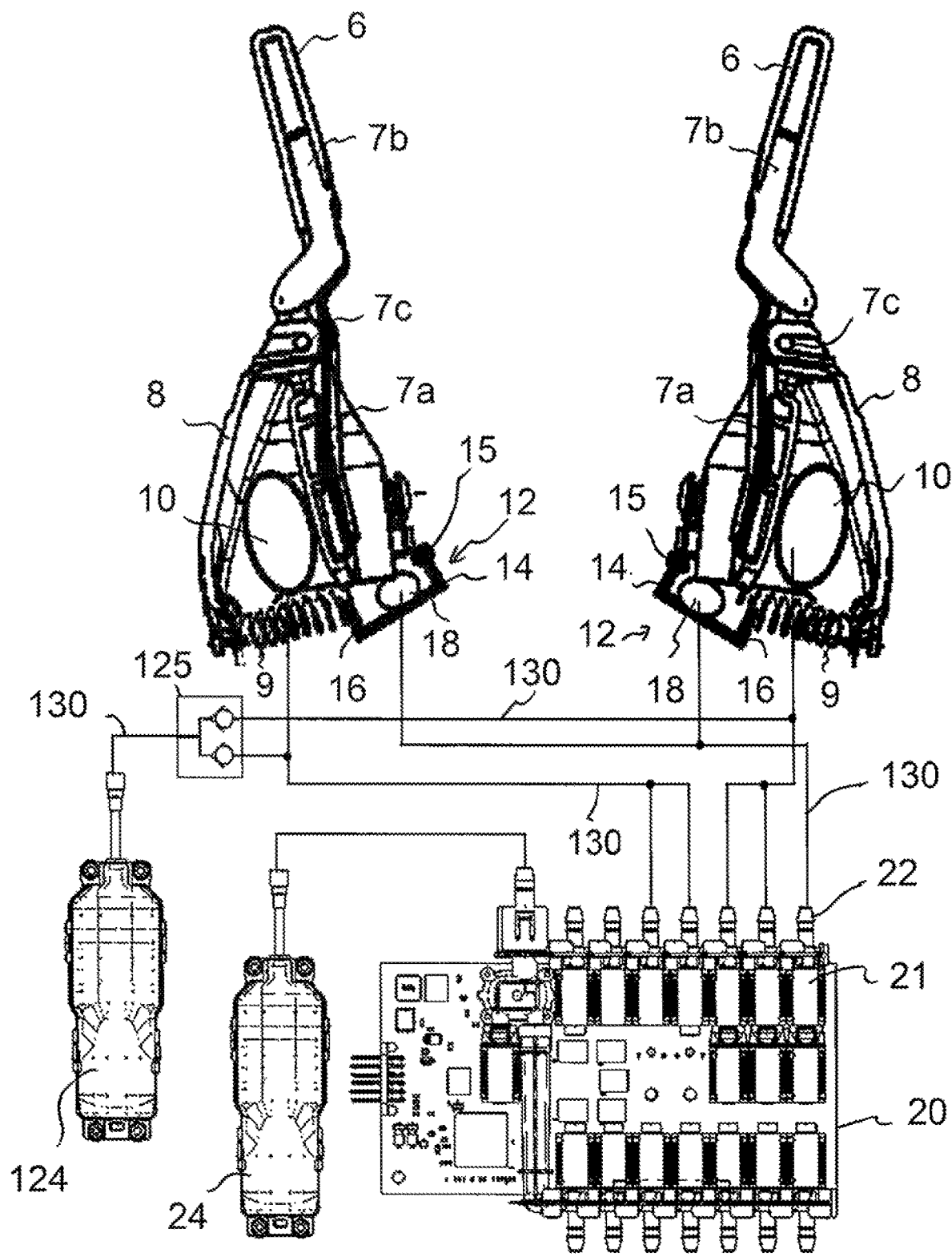
FIG. 6 shows an embodiment modified in relation to FIGS. 4 and 5 including an additional performance pump for actively adjusting the balloon device to the default position.

These adjustments according to the FIGS. 2, 3 are provided, in principle also in the embodiment shown in FIGS. 4 through 6. Hereby, one locking means 12 is provided for locking each of the wing adjustment means, i.e. in each side wing. Thus, the two locking devices 12 may be designed identical or similar respectively and shall be described in the following e.g. with reference to the embodiment shown on the left side.

According to the embodiment shown, the locking means 12 is designed as a pneumatic locking means, here comprising a pivoting locking lever 14 mounted in a locking bearing 15. The locking bearing 15 may be provided—like the swivel axis 7c of the lever 7—in particular e.g. to be affixed to the back rest; the locking bearing 15 will not be adjusted by the adjustment of the lever 7, i.e. in particular not even by swiveling of the inner lever arm 7a.

Further, the locking lever 14 comprises a latch 16 (locking arm) provided for engaging behind or engaging respectively and locking the inner lever arm 7a and/or the spring 9:

The locking lever 14 can pivot about a—relatively small—swing distance between the unlocked position shown in FIG. 4, in which the latch 16 does not engage thereby having no functional effect yet, and the locking position shown in FIG. 5. FIGS. 4 and 5 show the default position which, thus, corresponds to FIG. 2; the balloon 10 has been inflated and has tensioned the spring 9 whereby, thus, in the left side wing 2a the inner lever arm 7a has been swiveled to the right into its default position. Thus, in the unlocked position of the locking means 12 the inner lever arm 7a is initially held by the balloon 10—against the action of the tensioned spring 9.

The locking means 12 comprises a locking balloon 18 serving as locking adjustment device for pivoting the locking lever 14. The locking balloon 18 may, in particular, be mounted on or inside the locking lever 14 and rests, in the inflated state shown in FIG. 4, e.g. in turn against the back rest frame, i.e. e.g. like the locking bearing 15 against an area unaffected by the pivoting action of the inner lever arms 7a thereby providing a secure counter bearing.

In addition, advantageously, a locking spring is provided which biases the locking lever 14 into its locking position and is thus tensioned by the locking balloon 18.

FIG. 5 shows the subsequent locking, i.e. the adjustment of the locking lever 14 into the locking position in which, thus, the latch 16 engages or engages behind in a form-fit manner respectively. Advantageously, the latch 16 may engage directly behind the inner lever arm 7a; in principle, however, an engagement with the spring 9 may be provided so that it e.g. locks the spring 9. Further, a mechanically coupled means, provided in addition, may be locked by the latch 16.

Thus, advantageously, locking happens by means of engaging behind so that the elastic force of the spring 9 will have no adjusting effect on the locking lever 14.

In the locking position of FIG. 5 it is also possible to subsequently empty the balloon 10. Also, it may empty over time e.g. due to leakage. Further, it may be provided to carry out the emptying of the balloon 10 by means of an active control signal so that the subsequent adjustment from the default position shown in FIGS. 5 and 2 to the actuation position of FIG. 3 will not be slowed down by the balloon 9. On the other hand, it may be provided that the balloon 9 is inflated in total or in part in order to somewhat dampen this adjustment motion.

According to the pneumatic controlling of FIGS. 4, 5 a valve block 20 is provided as pneumatic controller both for filling both the balloon 10 and the locking balloon 18. Hereby, the valve block 20 may comprise a suitable number of valves 21 and pneumatic outlets 22 so as to correspondingly control the pneumatic devices in each of the two side wings. According to the embodiment shown here in FIGS. 4, 5, a single pneumatic pump 24 is provided for the valve block 20 which, thus, can be utilized for all adjustments. Pneumatic ducts 130 run from the valve block 20 to both the balloon device 10 and the locking balloon 18; thus, it is possible, via the pneumatic ducts 130 and the valve block 20, to fill both the balloon device 10 and the locking balloon 18 and—via suitable valves in the valve block 20—to empty them.

The controlling of the side wings on the left and the right side may happen in synchronized fashion, in particular, as shown here, by means of identical pneumatic ducts 130 with subsequent branching, thereby reducing expenditure in hardware and controlling complexity.

The embodiment shown in FIG. 6 differs from FIG. 4 in that an auxiliary pump 124 or balloon pump 124 is provided, which is provided in addition to the pneumatic pump 24 and serves, in particular, for quick adjustment of the two balloons 9. Hereby, in addition, as shown, a heck valve means (check valves) 125 may be provided which, thus, blocks any reflux from the balloons 9 to the auxiliary pump 124.

Thus, according to the embodiment of FIG. 6, it is possible to attain a high performance or output respectively in which the adjustment, perceivable by the customer, of the inner lever and thereby the adjustment between the actuation position and the default position happens directly by the auxiliary pump 124, without any pneumatic flow through the valve block 20 which may slow down such adjustment.

In vehicle seats having a seat cushion and a back rest the seat occupant is usually seated in-between laterally projecting side wings (side bolsters) which thereby support him sideways. Hereby, some vehicle seats allow their side wings to be adjusted to the seat occupant.

To that end, adjusting devices are provided e.g. in the seat portion or the back rest allowing for an adjustment of the outer side wings towards the inside so as to better receive the seat occupant and provide lateral support. Such adjustment may also serve to increase the safety of the seat occupant in dangerous situations or critical driving situations. Thus, e.g. upon rounding a turn, the adjustment of the side wings may result in an improved bracing of the seat occupant against the inertial forces acting on his body. Hereby, in general, the vehicle seats have a default position with the side wings being adjusted towards the outside, so as to enable easy seating of the seat occupant including, in particular, seat occupants of various dimensions. Upon activating the wing adjustment, these will then usually be adjusted inwards, i.e. towards the center of the seat.

For the purpose of adjusting the side wings, on the one hand, electro-mechanical adjusting devices are known which are relatively heavy and costly, however. Furthermore, in particular, pneumatic adjusting devices are known which generally comprise balloons or air chambers or air pockets which may be inflated via e.g. a pump provided and located centrally inside the vehicle seat and pneumatic ducts. This allows the seat to be adjusted at different positions with a relatively small expenditure in hardware, whereby the adjustments are perceived as smooth and the pneumatics allows an overload protection to be implemented. Often, the pneumatic air cushions or balloons are provided directly inside the side wings; for inwards adjusting the side wings inwards the air cushion is inflated thereby pressing the side wing inwards, e.g. via an interposed plastics plate.

However, usually, such comparative adjustment means are relatively slow, in particular, if several balloons are to be adjusted via one pump of limited pumping capacity and corresponding pneumatic ducts.

The present disclosure is based on the object of creating an adjusting device for adjusting a side wing of a vehicle seat and a corresponding vehicle seat allowing for a safe and quick adaptation of the side wing with relatively little effort.

This task is solved by an adjusting device according to the present disclosure and a vehicle seat with a corresponding adjusting device.

Thus, a lever is provided as pivoting which may be articulated, in particular, in a swivel axis to a frame, e.g. back rest frame, of the vehicle seat. The lever, with its outer lever arm, i.e. the lever arm projecting outwards, pivots the side wing inwards and outwards; the lever is actuated via its inner lever arm, which is engaged by, on the one hand, a balloon device, i.e. in particular a one-chamber or multiple-chamber balloon or air pocket, and, on the other hand, a spring means. Hereby, the balloon device presses to inner lever arm into the default position, i.e. in particular, inwards in such a way that the outer lever arm is pivoted outwards thereby adjusting the side wing or a lateral support of the side wing respectively into the opened position. To that end, the balloon device may be provided, in particular, directly between the inner lever arm and a counter bearing or, respectively, a support affixed to the seat, e.g. the back rest frame. The spring means counteracts the balloon device and biases the inner lever arm into the actuation position.

Generally, the spring means may be any means storing energy and exerting a force, i.e. in particular, storing energy by means of deformation, compression or extension/expansion. To that end, the spring means may be, in particular, a mechanical spring means, i.e. in particular elastically tensile by torsion or tension. Thus, the spring means may be e.g. a helical spring or a torsion bar. Hereby, the spring means may be e.g. a metal spring, but alternatively also a rubber spring or a composite spring made of a multiplicity of materials, a plastics spring or any combination thereof. Thus, according to one embodiment, the spring means may even be designed to be pneumatic, i.e. as a spring balloon device, counteracting the first balloon device.

The spring means may be stretched, in particular, between the inner lever arm and a counter bearing affixed to the seat, e.g. the back rest frame.

The spring bias of the spring enables a quick adjustment of the side wing into the actuation position; this adjustment direction does not depend on the pneumatic actuation or, respectively, the relatively slow filling of the balloon via the pump and the duct. Thus, it is possible, despite limited dimensions of the balloon device, the pneumatic duct, and the pneumatic pump or compressor respectively, to still attain a quick and secure inwards adjustment of the side wing.

Then, for resetting, the balloon device is re-inflated so that it swivels—against the action of the spring—the inner lever arm back again into its default position, i.e. inwards, causing the outer lever arm projecting into the side wing to swivel outwards.

Thus, it is possible, in particular, to attain an adjustment speed from the default position into the actuation position corresponding to that of an electro-mechanical adjustment means, without having to provide for such an expensive hardware including the required electro-mechanical means in the side wings.

Thus, a significant advantage of the present disclosure lies in the reduced reaction time and quicker adjustment of the side wing, independent of the dimensions of the pneumatic devices.

According to the present disclosure there is further provided a locking means locking the default position. Thus, at first, the balloon device is intended to tension the spring means from the actuation position into the default position, i.e. the balloon device acts against the spring means during filling, swivels the lever thereby tensioning the spring means. After the default position has been reached the locking means locks this default position, in particular as a mechanical lock. Thus, the lever and thereby the side wing will remain in the default position until the locking means is again adjusted from its locking position to its unlocking position thereby releasing the spring means. The tensioned, now released spring means can then slacken off thereby adjusting the inner lever arm into the actuation position.

By virtue of the additional locking means a few advantages ensue:

Without the locking means, firstly, the balloon device is provided to hold the spring means in its tensioned position. Thus, the balloon device filled with air, in the default position, acts permanently against the tensioned spring means. However, pneumatic balloon devices may generally exhibit a certain leakage that may be occurring over time in the balloon device itself or also in the pneumatic ducts, or the connections between the balloon device and the pneumatic ducts. Since the default position is held over a longer period and the balloon device is initially loaded by the tensioned spring means, i.e. possibly exhibiting a slight excess pressure due to the spring tension, a loss of air may occur in the balloon device after a longer period of time, which—in the event of an unlocked default position—has to be compensated by re-filling.

In order to attain a long-term secured default position with little effort and a high level of security, according to the present disclosure, a locking means is provided.

Therefore, since the default position is locked, i.e., thus, in particular the lever and/or the spring means being locked in the default position, following the adjustment into the default position, the balloon device is no longer to hold the default position. Thus, the balloon device may subsequently be emptied in total or in part. In principle, it is not necessary to empty the balloon device after locking; however, it is possible to release a valve of the pneumatic duct to the balloon device so that the balloon device may empty again.

The locking means may lock, in particular, the lever, in particular, the inner lever arm, and/or the spring means. The locking means may be, in particular a mechanical locking means, i.e. carry out a mechanical adjustment and mechanical lock the lever and/or the spring means.

This locking effect may be achieved, in particular, by virtue of a form fit and/or by engaging in behind. Thus, the locking means may engage e.g. in behind the inner lever arm and/or the spring means by means of a latch, e.g. a mechanical locking arm, thereby blocking the adjustment of the lever arm and/or the spring means into the actuation position. By means of such a mechanical lock or, respectively, a mechanical engaging in behind a high level of security is attained; without adjustment of the locking means into its unlocked position the spring means and/or the lever arm will not be released and, consequentially, cannot be adjusted into the actuation position.

The locking means may in turn be adjusted pneumatically or even non-pneumatically. The locking means may be e.g. pivoting mounted or hinged, e.g. on the back rest frame. Thus, the locking means—such as the lever or inner lever arm respectively—may be firmly held on the back rest frame, so that the bearing of the locking means will not be affected by any adjustment between the default position and the actuation position.

The present disclosure leads to a number of advantages:

A secure hold in the default position with biased spring means is attained, without the balloon device maintaining a sustained force for holding the biased spring means.

It is not necessary to monitor or measure the pressure inside the balloon device; moreover, it is not necessary to detect a possible leakage during the default position phase.

The balloon device and its pneumatic duct are to be dimensioned sufficiently secure to enable filling the balloon device for adjusting the lever arm and for tensioning the spring means; however, in principle, leakage occurring in the long term does not present a problem.

Replenishing or refilling is not required to hold the default position; thus, in principle, the complexity of the control is reduced.

It is made possible to repeatedly position the side wings because there is secure locking after adjustment.

The balloon device and its pneumatic ducts are conserved because they are not permanently pressure stressed in the default position; merely the adjustment procedures for adjusting the lever and the spring means into the default position are used. This also extends the service life of the balloon device as well as the pneumatic components.

In principle, the locking means may be designed in a standardized manner for different systems. It may be provided such that it allows for mechanical locking, independently of the respectively employed balloon devices which may differ in size, volume and shape, possible even in the amount of air pressure used. Hereby, in principle, the locking means may be designed in a standardized manner and allows for a universal solution.

Customer acceptance is increased because the secure mechanical locking helps to avoid a persistent pneumatic exertion of pressure for securing the default position.

Further, the balloon device, the pneumatic ducts leading to the balloon device, and the pneumatic valves for filling the balloon device may be configured for the filling process, i.e. the procedure for making the adjustment to the default position, including e.g. as regards the des pneumatic transport volume. This can enable a quick filling process thereby also allowing for quick adjustments.

Further, the adjustment from the default position to the actuation position can be accelerated because with this adjustment the spring means is no longer required to compress the balloon device.

The locking means is adjusted by a locking adjustment device which in turn may be formed by a pneumatic locking adjustment device, in particular, by a locking balloon. This pneumatic locking adjustment device, in principle, may be dimensioned significantly smaller than the balloon device for adjusting the inner lever arm and for tensioning the spring means; for the pneumatic locking adjustment device it is not necessary to exert a force like in the case of the balloon device for adjusting the inner lever arm.

Hereby, a pneumatic locking adjustment device, in particular a pneumatic locking balloon, allows for a pneumatic control of both the balloon device for adjusting the inner lever arm and the pneumatic locking adjustment device. This, in principle, it is possible to provide a common pneumatic control device, e.g. having several pneumatic valves, which may be provided in a common housing. Thus, it is possible again to attain a high cost efficiency and a small portion of components. Hereby, it is possible to provide secure control of the various procedures, in particular the adjustment between default position and actuation position as well as, vice versa, from the actuation position to the default position, and, further, the locking after the adjustment from the actuation position to the default position. Thus, a common valve block may be provided for guaranteeing all functions and adjustments.

Hereby, in principle, a common pneumatic pump may be provided which e.g. feeds air to the common valve block which will then supply the different pneumatic inserts, both for the balloon device for adjusting the inner lever arm and tensioning the spring means and the pneumatic locking adjustment device, with air or compressed air respectively.

In the alternative, an additional pump for e.g. the active adjustment of the inner lever arm may be provided, thereby increasing the performance of this adjustment means. Thus, the adjustment of the lever and the side wings may happen directly via the additional pump without the necessity of guiding the air flow via the valve block.

According to the present disclosure, the adjusting device may be provided inside the back rest and/or inside the seat cushion, i.e. therein respectively inwards adjusting the side wings for supporting the seat occupant and to return these outwards into the outer position for re-adjustment. Thus, a vehicle seat may exhibit such adjustment devices both in the back rest and in the seat portion which, in particular, are also actuated by a common pump with corresponding v ducts. Hereby, the relatively slow re-adjustment by the common pump is not relevant.

The development according to the present disclosure can be used with different designs of the side wing of the back rest and the seat cushion, whereby, in each case, suitable levers with lever arms projecting into the side wings may be provided. Thus, it is possible to aspire to a cost efficient, uniform development for different types of seats.

The weight of the vehicle seat is increased by the adjusting device only to a minor extent, because e.g. a balloon and pneumatic duct can be formed using little mass and volume, also the mechanical resetting device may be formed by a simple spring, e.g. tension spring or torsion spring, exhibiting no relevant amount of weight. In particular, several such adjustment devices may be mounted on the vehicle seat. The locking means and its controller, too, can be formed in a simple manner, in principle.

Further, the packaging or the assembling respectively of the adjusting device may be moved essentially from the bolster region towards the interior of the seat cushion or the back rest; thus, the inner lever arm, the spring means, and the balloon device may be provided in an inner region so that only the outer lever arm projects into the bolster region, e.g. by a side wing adjusted by it. This improves the freedom of design of the bolster and the packaging.

The following numbered clauses include embodiments that are contemplated and non-limiting:

Clause 1. A pneumatic adjusting device (4) for adjusting a side wing (3a) of a vehicle seat (1) from a default position to an actuation position, the adjusting device (4) comprising:
a two-armed lever (7) having an outer lever arm (7b) for adjusting the side wing (3a) and an inner lever arm (7a),
an inflatable balloon device (10) for adjusting the inner lever arm (7a), and
a spring means (9) for adjusting the inner lever arm (7a),
wherein in the default position of the adjusting device (4), the balloon device (10) is inflated, in the default position, the spring means (9) is tensioned and biases the inner lever arm (7a) into the actuation position, in the actuation position, the spring means (9) compresses the balloon (10), and a locking means (12) is provided which is adjustable between an unlocked position and a locking position and, in its locking position, locks the default position.

Clause 2. The adjusting device (4) according to clause 1, wherein the locking means (12), in its locking position, secures the default position against the spring action of the spring means (9) even when the balloon device (10) is empty.

Clause 3. The adjusting device (4) according to clause 1 or 2, wherein the locking means (12), in its locking position, engages behind and/or secures in a form-fit manner the lever (7), in particular the inner lever arm (7a), or an element connected to the lever (7), or the spring means (9), by means of a latch (16).

Clause 4. The adjusting device (4) according to one of the above clauses, wherein the locking means (12) comprises a locking adjustment means (18) for adjusting the mechanical latch (16), e.g. a picoting locking lever (14) with the latch (16) between the unlocked position and the locking position.

Clause 5. The adjusting device (4) according to clause 4, wherein the locking means (18) is biased by a locking spring into the locking position and can be unlocked by the locking adjustment means (18).

Clause 6. The adjusting device (4) according to clause 4 or 5, wherein the locking adjustment means (18) can be actuated pneumatically, e.g. as a locking balloon (18), for picoting the locking lever (14).

Clause 7. The adjusting device (4) according to clause 6, wherein the locking balloon (18) can be inflated for unlocking the locking means (12) and emptied for locking the locking means (12).

Clause 8. The adjusting device (4) according to clause 6 or 7, wherein the locking balloon (18) and the balloon device (10) can be commonly pneumatically controlled, e.g. via a common pneumatic pump (24) and/or via a common pneumatic valve block (20).

Clause 9. The adjusting device (4) according to one of the above clauses, wherein it comprises:

a pump (24) for pneumatically controlling the locking balloon (18) and the balloon device (10) via a common valve block (20) and a further auxiliary pump (124) or performance pump, controlling the balloon device (10) bypassing the valve block (20), e.g. by means of a check valve device (125).

Clause 10. The adjusting device (4) according to one of the above clauses, wherein the balloon device (10) is of a one-chamber or multi-chamber type, in particular as a one-chamber balloon (10), and, upon being inflated, increases the distance between the inner lever arm (7a) and a counter bearing, e.g. the back rest frame (8).

Clause 11. The adjusting device (4) according to one of the above clauses, wherein, in the default position, the inner lever arm (7a) is adjusted inwards towards the center of the seat and the outer lever arm (7b) is adjusted outwards.

Clause 12. The adjusting device (4) according to one of the above clauses, wherein the balloon device (10) and the spring means (9) engage directly on the inner lever arm (7a).

Clause 13. The adjusting device (4) according to one of the above clauses, wherein the spring means is a mechanical spring means, e.g. a tension spring (9), helical spring and/or torsion spring, provided between the inner lever arm (7a) and a counter bearing, e.g. the back rest frame (8).

Clause 14. The adjusting device (4) according to one of the above clauses, wherein the lever (7) is firmly mounted in a swivel axis (7c) formed between the lever arms (7a, 7b) on a counter bearing, e.g. the back rest frame (8), and a side support (6) is mounted on the outer lever arm (7b) which is provided as part of the side wing (3a) or inside the side wing (3a).

Clause 15. The adjusting device (4) according to one of the above clauses, wherein is comprises two wing adjustment means (4a, 4b) each for adjusting one of the two side wings (3a; 2a), whereby each wing adjustment means (4a, 4b) each comprises a lever (7), a balloon device (10) and a spring means (9).

Clause 16. A vehicle seat (1), comprising:
a seat cushion (2),
a back rest (3), and
an adjusting device (4) according to one of the above clauses, adapted for adjusting the two side wings (3a, 2a) of the back rest (3) and/or the seat cushion (2) in a transverse direction (y) inwards and outwards.

Clause 17. The vehicle seat (1) according to clause 16, wherein both in the seat cushion (2) and in the back rest (3) there is provided an adjusting device (4) each, each including two wing adjustment means, for adjusting both the back rest side wings (3a) and the two seat portion side wings (2a), whereby a common pump is provided for the adjustment devices (4).

The invention claimed is:

1. A pneumatic adjusting device for adjusting a side wing of a vehicle seat from a default position to an actuation position, the adjusting device comprising:
a two-armed lever having an outer lever arm for adjusting the side wing and an inner lever arm,
an inflatable balloon device for adjusting the inner lever arm, and a spring means for adjusting the inner lever arm,
wherein in the default position of the adjusting device, the balloon device is inflated, in the default position, the spring means is tensioned and biases the inner lever arm into the actuation position, in the actuation position, the spring means compresses the balloon device, and a locking means is provided which is adjustable between an unlocked position and a locking position and, in its locking position, locks the default position.

2. The adjusting device of claim 1, wherein the locking means, in its locking position, secures the default position against the spring action of the spring means even when the balloon device is empty.

3. The adjusting device of claim 1, wherein the locking means, in its locking position, engages behind and/or secures in a form-fit manner the lever, in particular the inner lever arm, or an element connected to the lever, or the spring means, by means of a mechanical latch.

4. The adjusting device of claim 3, wherein the locking means comprises a locking adjustment means for adjusting the mechanical latch, the locking adjustment means including a pivoting locking lever with the mechanical latch between the unlocked position and the locking position.

5. The adjusting device of claim 4, wherein the locking means is biased by a locking spring into the locking position and can be unlocked by the locking adjustment means.

6. The adjusting device of claim 4, wherein the locking adjustment means can be actuated pneumatically as a locking balloon, for pivoting the locking lever.

7. The adjusting device of claim 6, wherein the locking balloon is inflated for unlocking the locking means and emptied for locking the locking means.

8. The adjusting device of claim 6, wherein the locking balloon and the balloon device are commonly pneumatically controlled via a common pneumatic pump and/or via a common pneumatic valve block.

9. The adjusting device of claim 6, wherein the adjusting device comprises:
a pump for pneumatically controlling the locking balloon and the balloon device via a common valve block and
a further auxiliary pump or performance pump, controlling the balloon device and bypassing the valve block by means of a check valve device.

10. The adjusting device of claim 1, wherein the balloon device is of a one-chamber or multi-chamber type, in particular as a one-chamber balloon, and, upon being inflated, increases the distance between the inner lever arm and a counter bearing.

11. The adjusting device of claim 1, wherein in the default position, the inner lever arm is adjusted inwards towards the center of the seat and the outer lever arm is adjusted outwards.

12. The adjusting device of claim 1, wherein the balloon device and the spring means engage directly on the inner lever arm.

13. The adjusting device of claim 1, wherein the spring means is a mechanical spring means which is a tension spring, a helical spring, and/or a torsion spring, provided between the inner lever arm and a counter bearing.

14. The adjusting device of claim 1, wherein the lever is firmly mounted in a swivel axis formed between the lever arms on a the back rest frame, and a side support is mounted on the outer lever arm which is provided as part of the side wing or inside the side wing.

15. The adjusting device of claim 1, further comprising two wing adjustment means each for adjusting one of the two side wings, whereby each wing adjustment means each comprises a lever, a balloon device and a spring means.

16. A vehicle seat comprising:
   a seat cushion,
   a back rest, and
   the adjusting device of claim 1, the adjusting device is configured to adjust the two side wings of the back rest and/or the seat cushion in a transverse direction inwards and outwards.

17. The vehicle seat of claim 16, wherein both in the seat cushion and in the back rest there is provided an adjusting device, each adjustment device including two wing adjustment means for adjusting both the back rest side wings and the two seat portion side wings, whereby a common pump is provided for each adjustment device.

\* \* \* \* \*